(12) United States Patent
Flathers (10) Patent No.: US 8,246,067 B1
(45) Date of Patent: Aug. 21, 2012

(54) TRAILER HITCH SUPPORT SYSTEM

(76) Inventor: Don G. Flathers, Marshalltown, IA (US)

( * ) Notice: Subject to any disclaimer, the term of this patent is extended or adjusted under 35 U.S.C. 154(b) by 263 days.

(21) Appl. No.: 12/581,635

(22) Filed: Oct. 19, 2009

(51) Int. Cl.
*B62D 53/04* (2006.01)

(52) U.S. Cl. ..................... 280/476.1; 280/407

(58) Field of Classification Search .............. 280/476.1, 280/405.1, 482, 407, 490.1
See application file for complete search history.

(56) References Cited

U.S. PATENT DOCUMENTS

| | | | | |
|---|---|---|---|---|
| 2,309,204 A | * | 1/1943 | Nelson | 280/476.1 |
| 4,253,679 A | * | 3/1981 | Sargent | 280/405.1 |
| 5,531,468 A | * | 7/1996 | White | 280/463 |
| 5,860,670 A | | 1/1999 | Aubin | |
| 5,924,716 A | | 7/1999 | Burkhart, Sr. et al. | |
| 6,224,083 B1 | * | 5/2001 | Tyler | 280/476.1 |
| 6,273,447 B1 | * | 8/2001 | Vande Berg | 280/476.1 |
| 6,419,247 B1 | * | 7/2002 | Moran | 280/86.5 |
| 6,685,211 B2 | | 2/2004 | Iles | |
| 6,733,028 B2 | * | 5/2004 | Teeple | 280/476.1 |
| 6,820,887 B1 | | 11/2004 | Riggle | |
| 7,237,789 B1 | | 7/2007 | Herman | |

\* cited by examiner

*Primary Examiner* — Kevin Hurley
(74) *Attorney, Agent, or Firm* — McKee, Voorhees & Sease, P.L.C.

(57) ABSTRACT

Described herein is a trailer hitch adapter designed to relieve the weight of a trailer from applying directly onto the hitch of a towing vehicle. The hitch adapter features a towing bar pivotally secured to a frame with a wheel base, the towing bar resists pivotal movement by spring and damper assemblies. The frame has a hitch for receiving the trailer and the towing bar has a hitch for attachment to the towing vehicle. The wheel base of the hitch adapter is movable between a forward and rearward position.

20 Claims, 10 Drawing Sheets

TRAILER HITCH SUPPORT SYSTEM

BACKGROUND OF THE INVENTION

The use of campers and other recreational vehicles which are towed behind a pick-up truck or other light-duty vehicle have increased dramatically over the years. The number of families who abandon traditional tents in favor of large campers has driven trailer manufacturers to increase the size and features available. With increased features and increased size comes an increase in the weight of the trailer.

However, while heavier trailers have become more popular, heavier hitches to haul the trailers have not. The average trailer hitch is able to support roughly one tenth its towing weight in vertical load. For example, a hitch which is able to tow 6,000 pounds of weight will only support 600 pounds of vertical load. Therefore, as can be shown, in order to pull the full supported 6,000 pounds of weight, the load must be virtually evenly distributed about the axle of the trailer. Most trailers are not designed with the axle centered on the trailer and most users of trailers do not consider this limitation in their towing vehicle when loading the trailer.

Because of overloading of trailers and unequal load distribution in the trailer itself, it is common for trailer hitches to suffer from increased wear and premature failure if subjected to regular overloading. It has therefore been recognized in the art that there is a need for a trailer hitch support apparatus which compensates for additional weight on a trailer. Several apparatus have been proposed which compensate for this increased weight, but each suffers from similar shortfalls.

One type of hitch adapter that is widely available is the "Hell Ya Hitch Helper" which features a square hitch coupler, spring suspension, and tires mounted to an axle. Another hitch adapter that is available is the invention described in U.S. Pat. No. 6,820,887. This device features a trailer adapter mounted to a pivoting axle, thereby allowing the axle of the device to turn with the vehicle. However, both of these hitch adapters are unable to be easily used in reverse, causing "scrubbing" of the tires, which results in uneven and excessive wear on the tires.

Therefore, it is the primary objective of the invention to provide a trailer hitch adapter which is able to support the weight of the trailer without damaging the hitch of the tow vehicle by eliminating the down forces of the trailer tongue weight, hence keeping the tow vehicle aligned to the road as before the trailer would be attached to tow vehicle.

It is a further objective of the invention to provide a trailer hitch adapter which will turn and follow the tow vehicle in both forward and reversing directions and prevent the hitch adapter from turning in an opposite or stationary position which in turn causes premature tire wear and damages.

It is also the objective of the invention to provide safe towing practices by allowing this hitch adapter to absorb the up and down movement of the trailer tongue weight and sideways swaying which will dramatically reduce the unstable forces to the towing vehicle and frame structure of the vehicle.

SUMMARY OF THE INVENTION

The following description generally describes a hitch adapter for use between a towing vehicle and a trailer. The hitch adapter has a forward and a rear hitch for engaging the towing vehicle and trailer, respectively. The forward hitch extends from the adapter on a towing bar. The rear hitch and towing bar are mounted to a first frame member. A set of wheels are mounted to a second frame member which may slide relative to the first frame member.

According to an alternative embodiment, the hitch adapter has a first hitch on a towing bar, the towing bar and a second hitch secured to a frame. The towing bar is secured to the frame so as to pivot about the frame. A shock assembly for resisting movement of the towing bar relative to the frame connects the towing bar to the frame.

DETAILED DESCRIPTION OF THE PREFERRED EMBODIMENT

The following description generally describes a hitch adapter for use between the tow vehicle and a trailer.

The top towing bar 20 has an adjustable slide plate for vertical alignment of the hitch adapter 10 which in turn slides into the towing vehicle's 12 hitch receiver 36. The adjustable slide plate has a plurality of slots for receiving a fastener.

The adjustable slide plate then attaches to a pivoting assembly 26 which has circular fastener holes corresponding to the plurality of slots on the adjustable slide plate. The combination of slots and through holes allows the pivoting assembly 26 to be vertically adjusted relative to the adjustable slide plate. The pivoting assembly 26 compensates for up and down movement on uneven surfaces.

The towing bar 20 assembles into the pivoting assembly 26. The opposite end of the towing bar 20 serves as the receiver for the trailer's hitch ball unit 28. The towing bar 20 is preferably manufactured of a square steel tube to receive the hitch ball unit 28, although other arrangements are anticipated.

The towing bar 20 has mounts for the middle frame positioning tensioners 40. The towing bar may also have two mounts for optional triangulation bars (not shown) mounting to the tow bar 20 for stabilization of the tow bar 20. A pivoting spindle is located by the trailer's hitch ball 28 assembly end to connect to the top frame assembly 46.

The top frame assembly 46 (the top frame may also be known as the more generic first frame) is located below towing bar 20 and attached to the towing bar 20 through the towing bar spindle and top frame assembly spindle/hub assembly 21 through means known in the art.

The top frame assembly 46 has a connection point for the positioning tension to the towing bar allowing the top frame assembly 46 and bottom frame assembly 48 (also called a second frame in a more generic sense) to pivot together for wheel direction of the hitch adapter while allowing the towing bar 20 to remain straight between the tow vehicle and trailer. The position tensioners 40 maintain the hitch adapter 10 in stable motion and turning with the tow vehicle 12.

The top frame assembly 46 incorporates a roller assembly 60 to the lower frame 48. This roller assembly 60 allows the lower frame wheel assembly movement forward and reverse to allow the changing of the tow bar/middle frame pivot point to either in front of or behind the wheel axle 56 thus allowing the adapter 10 to track the proper directions as controlled by the towing vehicle 12. When the pivot point is in front of the axle 56, forward motion; when the pivot point is behind the axle 56, reverse motion.

The top frame assembly 46 has a movement/sliding drive device 54 attached to itself for automatic positioning to the lower frame assembly 48, but will also function without said drive device for manual positioning of movement direction. The sliding drive device 54 is preferably a hydraulic or pneumatic piston, although other arrangements are anticipated.

The bottom frame assembly 48 incorporates the hitch adapter's wheels 16, tires, axle 56, load bearing leaf springs 52, dampening shocks, and support structure for movement/sliding drive device 54 attached to the top frame assembly 46 for forward or reverse positioning.

Figure 1A:
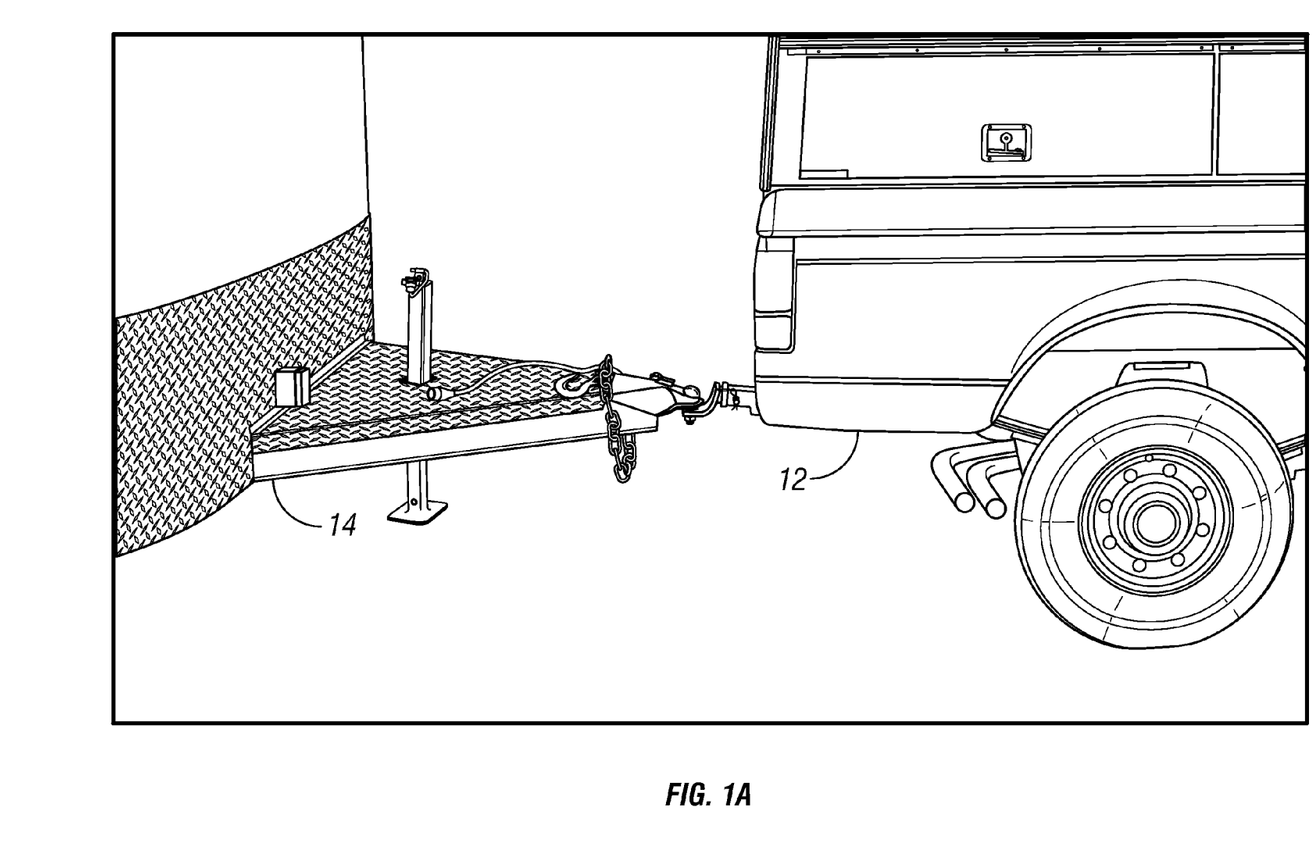
FIG. 1A is an elevated side view of a trailer mounted to a vehicle.

FIG. 1A shows the conventional method of connecting a trailer to a vehicle. A trailer hitch on the towing vehicle 12 receives the trailer. As explained in the background of the invention, this provides extra weight onto the hitch and vehicle suspension.

Figure 1B:
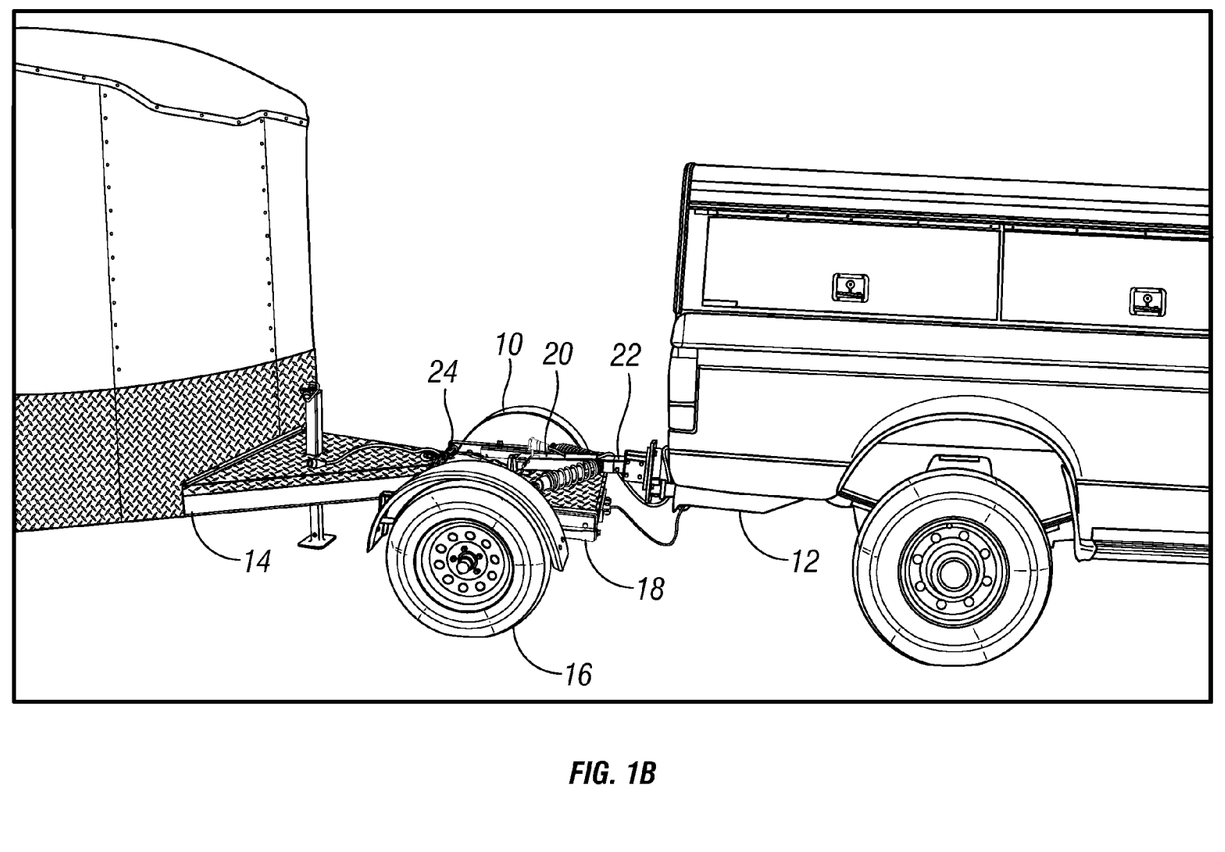
FIG. 1B is an elevated side view of a trailer mounted to an adapter, the adapter mounted to the vehicle.

As generally shown in FIG. 1B, the adapter 10 is designed to be placed between a towing vehicle 12 and a trailer 14 to relieve the load on the towing vehicle. The adapter 10 generally consists of a set of wheels 16, a frame 18, and a towing bar 20 extending from the front 22 of the adapter. The towing bar 20 has at its forward end a square hitch 26 and at its rearward end is adapted to receive a ball hitch 28. The forward square hitch 26 is attached to the towing vehicle 12 and the rearward ball hitch 28 is attached to the trailer.

Figure 2:
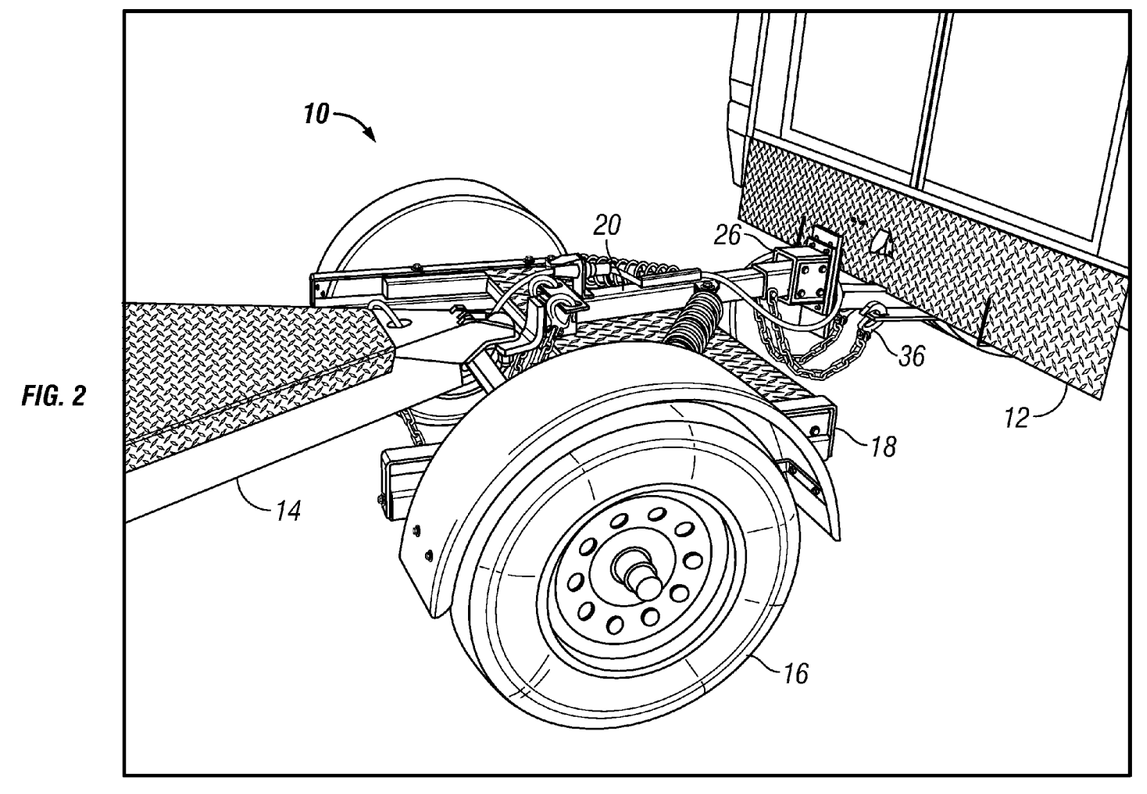
FIG. 2 is an enlarged elevated side view of the adapter shown in FIG. 1B.

As shown in FIG. 2, the towing bar 20 is pivotally attached to the frame 18 at a point near the rearward end. At the forward end of the towing bar 20 is a forward hitch assembly 26 which engages with the towing vehicle 12.

The forward hitch assembly 26 consists of a square hitch insert 30 and a kingpin assembly 32 which engages the towing bar 20 of the adapter 10. The kingpin assembly 32 pivotally supports the towing bar 20 so that the adapter 10 can move vertically relative to the towing vehicle 12 without being disconnected. The kingpin assembly allows for the adapter 10 to move vertically relative to the towing vehicle 12 when travelling over uneven ground. This stops the hitch on the towing vehicle 12 from bearing the full weight of the trailer 14 and adapter 12. The square hitch insert 30 is generally an elongated tube of a square cross section with a hole 34 perpendicular to the axis. This hole 34 receives a pin (not shown) which locks the hitch insert 30 to the hitch 36 on the towing vehicle 12 and prevents the hitch 30 from being disengaged from the towing vehicle 12.

The towing bar is preferably made of a square tube steel, allowing a ball hitch 28 to be inserted into the rearward end of the towing bar 20. The towing bar 20 is pivotally connected to the frame 18 near the rearward end. The towing bar 20 features an extension 38 passing through the frame 18. The towing bar 20 is allowed to pivot about the frame 18, thereby allowing the frame 18 to turn separately from the towing vehicle 12. Also between the frame 18 and towing bar 20 are a pair of spring 42 and damper 44 shocks 40 which resist movement of the towing bar 20. These shocks prevent "jackknifing" of the hitch adapter 10 when the towing vehicle 12 is turned while in reverse by guiding the wheels 16 of the adapter 10 to track with those of the towing vehicle 12. These shocks 40 also prevent the trailer 14 from fishtailing due to the presence of two pivot points (between the towing bar 20 and frame 18 and between the rear hitch 28 and trailer 14) by providing resistance against pivoting.

The frame 18 consists of two parts, a top frame assembly 46 and a bottom frame assembly 48. The shocks 40 and towing bar 20 are mounted to the top frame assembly 46. The wheel assembly 50 is mounted to the bottom frame assembly 48 and consists of springs 52, an axle 56, and the wheels 16, although it should be understood that alternative methods of mounting wheels to a frame are known in the art. For example, traditional damper shocks may be utilized, or the wheels may be mounted to separate axles, or several wheel sets may be used.

Figure 5:
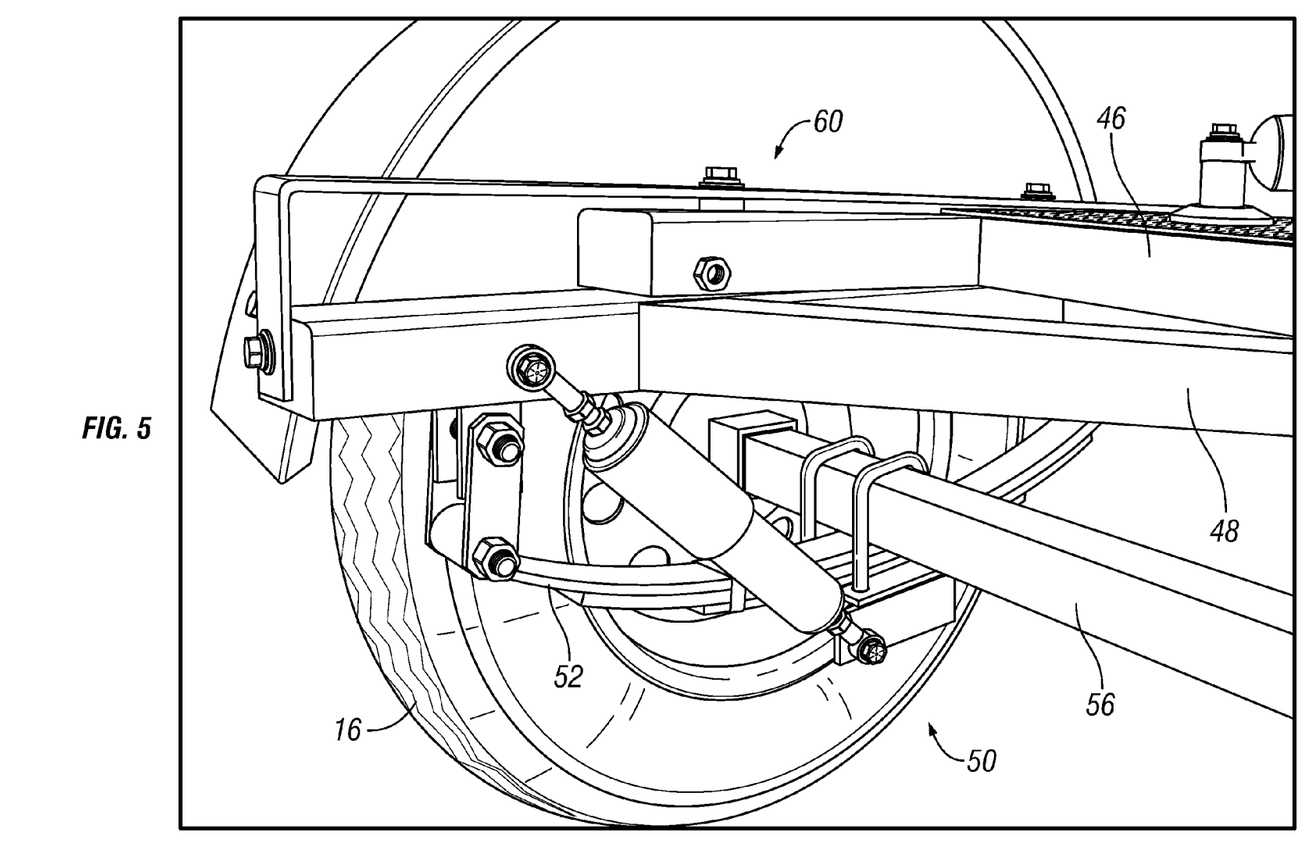
FIG. 5 is an enlarged perspective view of the underside of the adapter.

The top 46 and bottom 48 frame assemblies are connected to one another by a sliding mechanism 60. This sliding mechanism 60 allows movement of the wheels 16 relative to the pivot point between the towing bar 20 and frame 18. As shown in FIG. 5, the sliding mechanism 60 is controlled to either a forward or a rearward position by a piston 56. When the sliding mechanism is in the forward position the pivot point between the towing bar 20 and frame 18 is in front of the axle 56, which is the preferred position for pushing the trailer 14. When the sliding mechanism is in the rearward position the pivot point between the towing bar 20 and frame 18 is behind the axle 56, which is the preferred position for towing the trailer 14.

Figure 6:
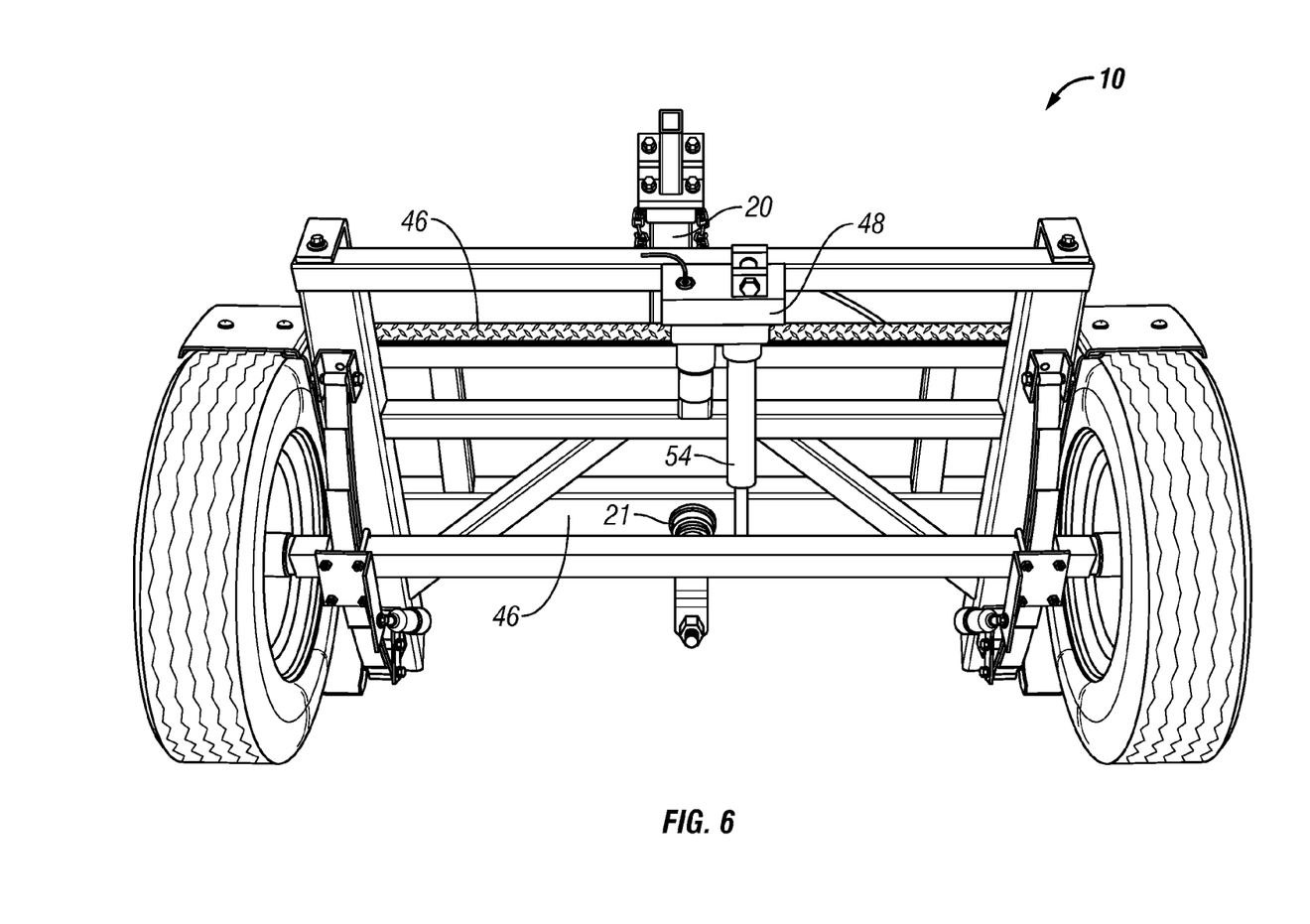
FIG. 6 is a view of the underside of the adapter with the actuator in an extended position.
Figure 7:
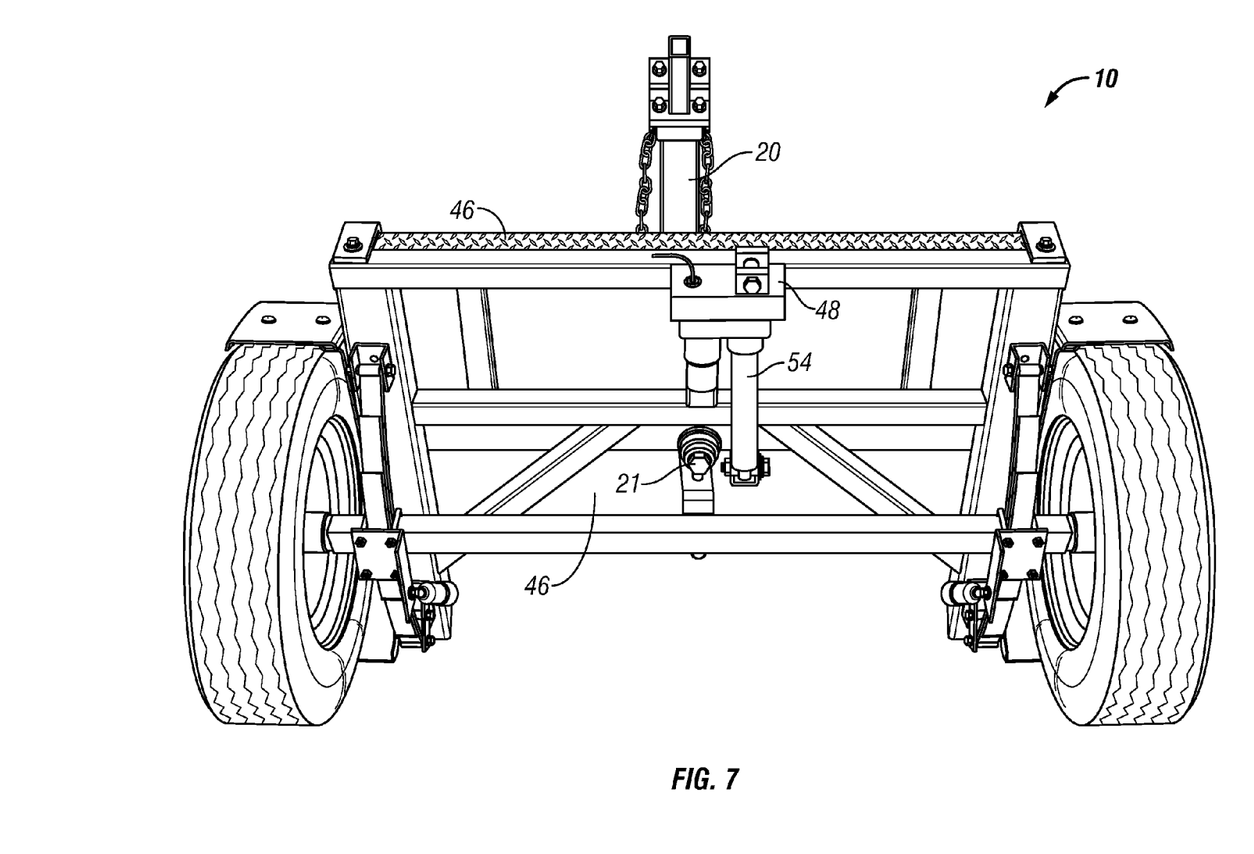
FIG. 7 is a view of the underside of the adapter with the actuator in a retracted position.

The sliding mechanism 60 is controlled to the forward or rearward position by means of a pneumatic or hydraulic piston 54, as shown in FIGS. 6 and 7. This piston 54 is preferably operated by an electrical signal sent from the towing vehicle 12. For example, because the trailer 14 is most maneuverable when being towed if the pivot point between the towing bar 20 and frame 18 is in front of the axle 56, the default position of the piston 54 should be that which places the frame 18 in the rearward position. When the towing vehicle 12 is placed in reverse, the piston 54 should automatically adjust so that the frame 18 is placed in the forward position.

Figure 3A:
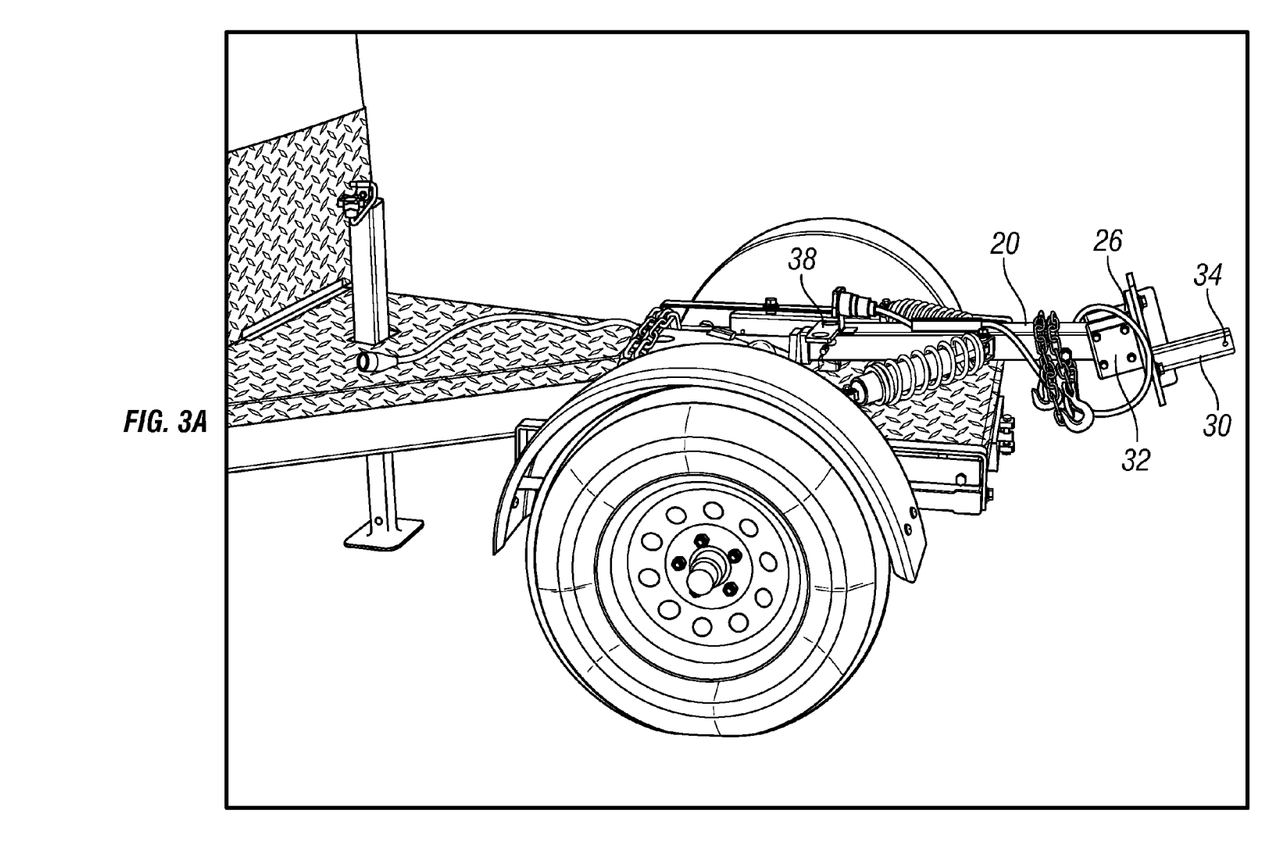
FIG. 3A is an elevated side view of the adapter with the vehicle removed and the adapter in a towing position.
Figure 3B:
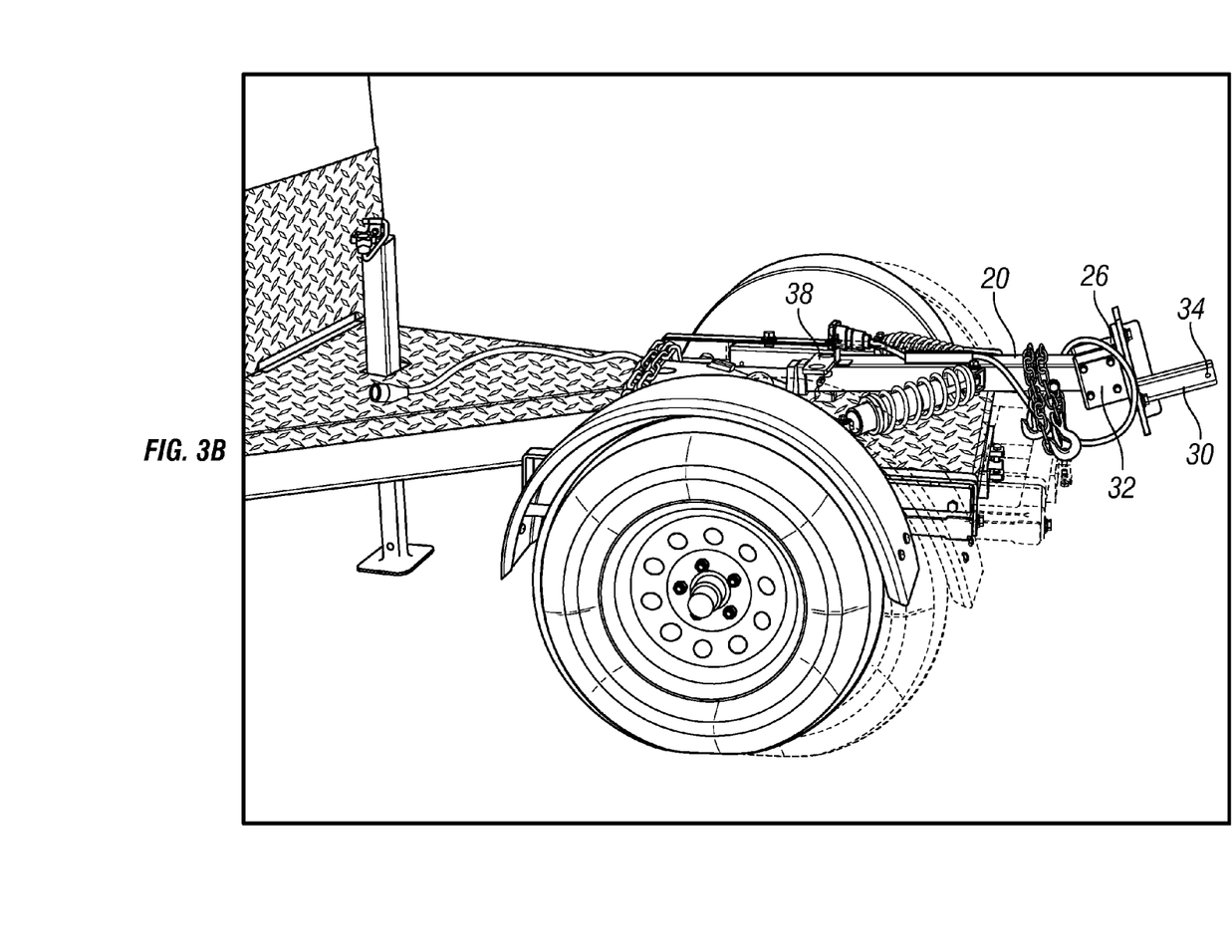
FIG. 3B is an elevated side view of the adapter with the vehicle removed and the adapter shown in a towing position with dashed lines indicating the adapter in a reverse position.
Figure 3C:
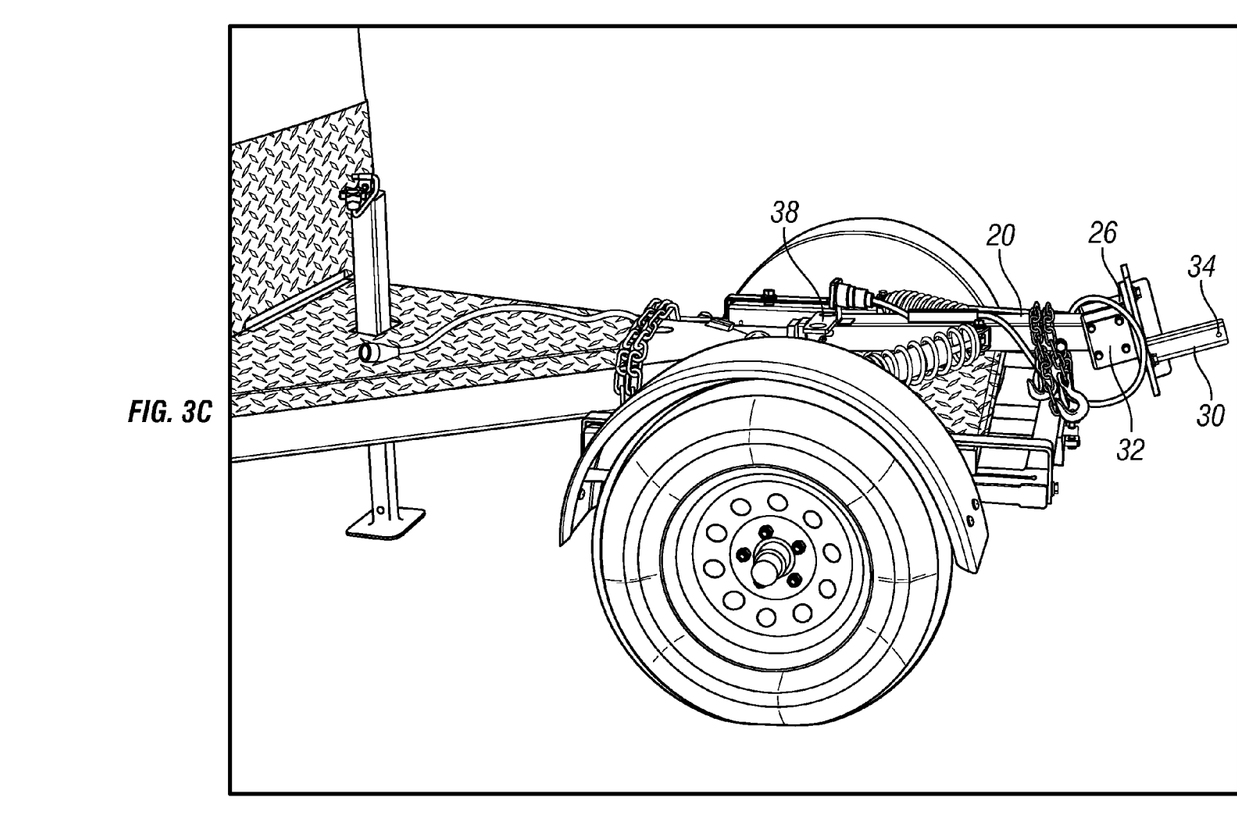
FIG. 3C is an elevated side view of the adapter with the vehicle removed and the adapter shown in a reverse position.
Figure 4:
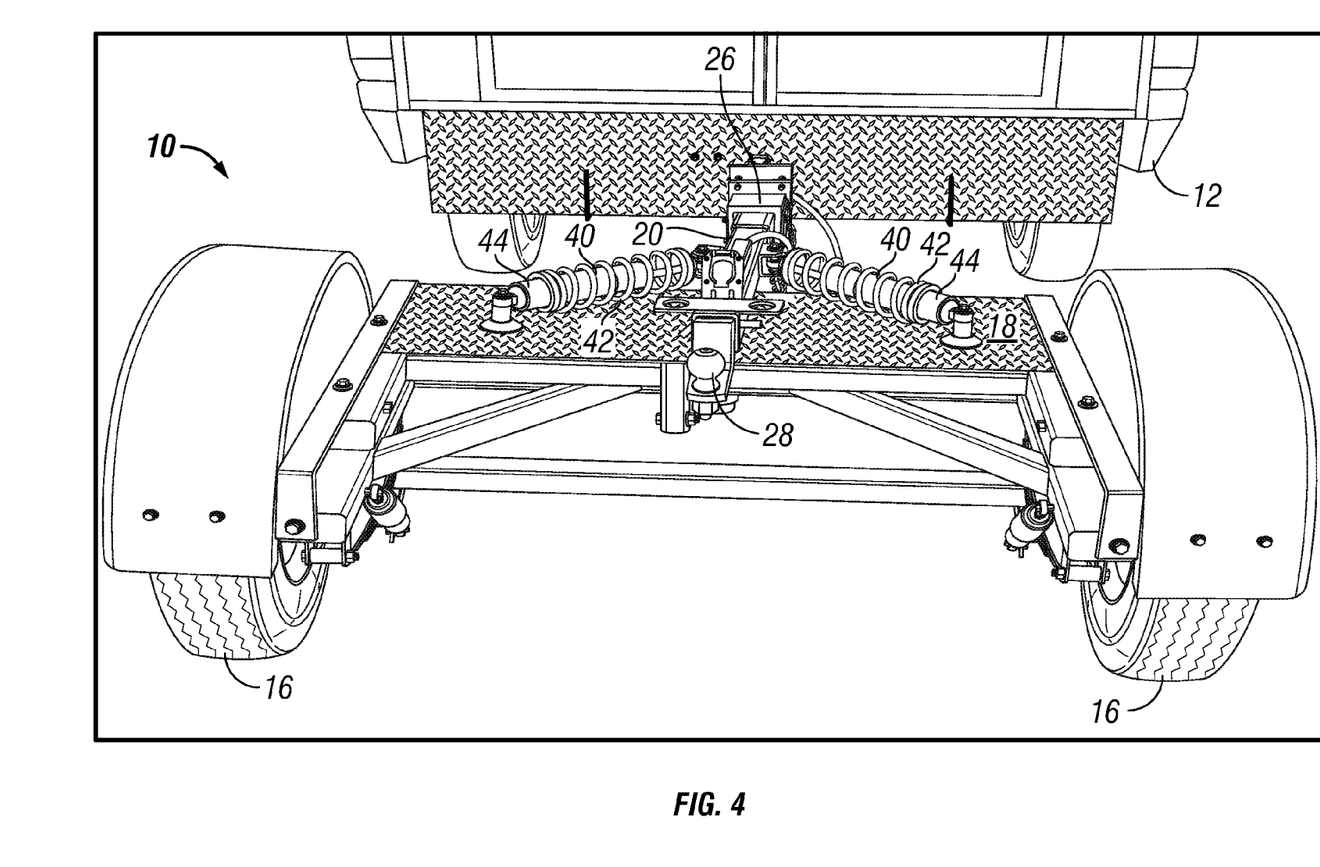
FIG. 4 is an elevated rear view of the adapter with the trailer removed.

FIGS. 3A-3C show the adapter being moved from a towing or forward position to a pushing or reverse position. FIG. 3A shows the adapter in a towing or forward position. In this position, the pivot point between the towing bar 20 and frame 18 is located behind the axle 56. When the towing vehicle is placed in a reverse gear, this fact is communicated to the adapter which moves the axle 56 or bottom frame assembly 48 to the reverse or pushing position.

FIG. 3B shows the adapter in the towing or forward position with the pushing or reverse position shown in dashed lines. Once the towing vehicle 12 is placed in a reverse gear, the piston actuates and begins to move the wheel and axle assembly to the location indicated in dashed lines. As can be seen, the wheel and axle assembly comprises part of the frame, and as the assembly moves, the axle is placed forward of the pivot point between the towing bar 20 and frame 18.

FIG. 3C shows the adapter in the reverse or pushing position. As can be seen, the wheel and axle assembly has been moved forward while the trailer and both forward and rear hitches have remained stationary. It is not necessary for an operator to exit the vehicle in this process, the entire system functions automatically.

One method of this communication between the vehicle 12 and adapter 10 is through an electrical connection between the towing vehicle and adapter. When the towing vehicle is placed in a reverse gear, an electrical signal is sent through the connection to indicate that reverse lights should be lit in the adapter or towed vehicle. The adapter may utilize this signal to trigger an actuator or solenoid coupled to the piston 54 to move the adapter to the reverse or pushing position.

As shown in FIG. 2, additional connectors between the towing vehicle and adapter as well as between the adapter and trailer may be included. For example, chains are commonly used to provide a backup connection between the hitches, should the hitch fail. Additionally, electrical connectors, controlling the brake and tail lights, are commonly used. It is also anticipated that other arrangements may be used.

In one alternative arrangement, triangulation bars may be added between the towing vehicle 12 and adapter 10. These triangulation bars generally consist of a rigid steel rod with rod ends secured to either end. The rod ends allow the steel rods to flex to some degree while traveling over the road, but provide additional support when backing up the vehicle 12 and adapter 10. Rod ends are generally known in the art. They constitute a spherical bearing with a through hole, the spherical bearing located within a bushing. The bushing has a threaded rod extending away from the bushing.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A hitch adapter for use between a towing vehicle and a trailer, the hitch adapter comprising:
   a forward hitch for engaging the towing vehicle;
   a rear hitch for engaging the trailer;
   a towing bar extending from the forward hitch;
   a first frame connected to the towing bar at a pivot point;
   a second frame slideably connected to the first frame; and
   at least one wheel mounted on an axle, the axle rotatably secured to the second frame.

2. The hitch adapter of claim 1 further comprising a piston between the first and second frames, the piston having a first position and a second position.

3. The hitch adapter of claim 2 wherein the pivot point is forward of the axle when the piston is in the first position.

4. The hitch adapter of claim 3 wherein the pivot point is rearward of the axle when the piston is in the second position.

5. The hitch adapter of claim 4 wherein the towing bar is pivotally attached to the forward hitch.

6. The hitch adapter of claim 5 wherein the forward hitch comprises a square hitch.

7. The hitch adapter of claim 6 wherein the rear hitch comprises a ball hitch.

8. The hitch adapter of claim 7 wherein the towing bar pivots relative to the forward hitch about an axis parallel to an axle of the towing vehicle.

9. The hitch adapter of claim 8 wherein the towing bar pivots relative to the first frame about an axis perpendicular to the axle.

10. A hitch adapter for use between a towing vehicle and a trailer, the hitch adapter comprising:
    a forward hitch for engaging the towing vehicle;
    a rear hitch for engaging the trailer;
    a towing bar extending from the forward hitch;
    a frame pivotally connected to the towing bar;
    an axle connected to the frame, the axle having at least one wheel, and wherein the axle is translational with respect to the frame; and
    a shock assembly coupling the frame to the towing bar.

11. The hitch adapter of claim 10 wherein the shock assembly consists of a spring and a damper.

12. The hitch adapter of claim 11 wherein the shock assembly resists turning of the towing bar relative to the frame.

13. The hitch adapter of claim 12 wherein the towing bar pivots relative to the frame about an axis perpendicular to the axle.

14. The hitch adapter of claim 13 wherein the towing bar is pivotally attached to the first hitch.

15. The hitch adapter of claim 14 wherein the towing bar pivots relative to the first hitch about an axis parallel to an axle of the towing vehicle.

16. The hitch adapter of claim 15 further comprising a suspension system coupling the axle to the frame.

17. A method of towing a trailer with a towing vehicle comprising the steps of:
    providing a trailer adapter comprising:
      a first frame slideably connected to a second frame;
      a towing bar pivotally attached to the first frame at a pivot point;
      a forward hitch on the towing bar;
      a rear hitch on the first frame;
      an axle having a wheel on the second frame;
    connecting the towing vehicle to the trailer adapter at the forward hitch;
    connecting the trailer to the trailer adapter at the second hitch;
    placing the vehicle in a forward or reverse gear; and
    sliding the first frame to position the pivot point forward of the axle when the vehicle is in a forward gear.

18. The method of claim 17 further comprising the step of sliding the first frame to position the pivot point behind the axle when the vehicle is in a reverse gear.

19. The method of claim 17 wherein the trailer adapter further comprises a shock assembly between the towing bar and first frame.

20. The method of claim 19 wherein the shock assembly comprises a spring and damper.

* * * * *